(12) United States Patent
Power et al.

(10) Patent No.: US 7,616,583 B1
(45) Date of Patent: Nov. 10, 2009

(54) METHOD AND PROGRAM PRODUCT FOR CONSOLIDATING COMPUTER HARDWARE RESOURCES

(75) Inventors: Jonathan Power, Austin, TX (US); Kevin Galloway, Austin, TX (US); Terry Harrison, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1273 days.

(21) Appl. No.: 10/888,881

(22) Filed: Jul. 9, 2004

Related U.S. Application Data

(60) Provisional application No. 60/489,406, filed on Jul. 23, 2003.

(51) Int. Cl.
*G06F 9/45* (2006.01)

(52) U.S. Cl. .................................. 370/252; 717/148

(58) Field of Classification Search ................. 370/252, 370/253, 254, 255, 244; 709/203, 223, 224; 717/148
See application file for complete search history.

(56) References Cited

U.S. PATENT DOCUMENTS

| | | | | |
|---|---|---|---|---|
| 5,745,880 A | * | 4/1998 | Strothmann | 705/7 |
| 5,793,632 A | * | 8/1998 | Fad et al. | 705/400 |
| 6,249,769 B1 | | 6/2001 | Ruffin et al. | |
| 6,920,474 B2 | * | 7/2005 | Walsh et al. | 709/200 |
| 7,467,095 B2 | * | 12/2008 | Ouimet | 705/7 |

* cited by examiner

*Primary Examiner*—Brian D Nguyen
(74) *Attorney, Agent, or Firm*—Arthur J. Samodovitz

(57) ABSTRACT

A computer determines a first plurality of servers which have a lease set to expire within a predetermined period or current or projected peak utilization greater than a predetermined percentage of their capacity. The computer determines a second plurality of servers which have sufficient lease term and excess capacity. The computer determines and records which servers of the first plurality to consolidate on servers of the second plurality based on sufficient capacity, match of application(s) and projected life span of the application(s) of the second plurality, and determines a schedule for retiring the servers of the first plurality with the applications having insufficient projected lifespan, and estimates cost savings for the consolidation.

14 Claims, 8 Drawing Sheets

HARDWARE SURVEY

| SERVER ID | LOCATION | VENDOR/ MODEL | CPU SPEED | RAM | TOTAL DISK | AVAIL. METHOD | PEAK UTIL % | AVG. UTIL % | NETWORK LOAD | OS TYPE | OS VERSION | PRIMARY FUNCTION |
|---|---|---|---|---|---|---|---|---|---|---|---|---|
| WebSys1 | AUS - Fac. 1 | IBM 9406 | 2 MHz | 4096 MB | 800 GB | Raid | 85 | 55 | Light | OS/400 | 4.3.2 | Web Serv |
| AppSys1 | AUS - Fac. 3 | IBM 7916 | 4 MHz | 256 MB | 100 GB | Mirror | 70 | 45 | Heavy | AIX | 4.4 | App Util |
| DBSys1 | MIA - Fac. 1 | iSeries 825 | 1.2 GHz | 48 GB | 58 TB | | 59 | 34 | Heavy | OS/400 | 5.2 | Data Stor |

FIG. 2

HARDWARE SURVEY ADDENDUM

| SERVER ID NO. | OWNERSHIP | END DATE | DEPREC. END | AVG. COST (2001-2002) | FIXED COST % | BOOK VALUE |
|---|---|---|---|---|---|---|
| WebSys1 | Leased | Sept. 2003 | N/A | $12,000/qtr | 30 | N/A |
| AppSys1 | Financed | Jan. 2004 | Jan. 2009 | $11,000/qtr | 20 | 524,987 |
| DBSys1 | Paid | N/A | Nov. 2003 | $19,000/qtr | 30 | 142,807 |

FIG. 3

TOTAL AVERAGE COST PER YEAR BY CATEGORY

| SERVER FUNCTION | ENTRY-LEVEL | MID-RANGE | ENTERPRISE |
|---|---|---|---|
| Application | $34,500 | $89,200 | $172,340 |
| Database | $37,500 | $91,500 | 135,400 |
| Sys Mgmt | $48,670 | $127,000 | 160,000 |
| filenet | $12,110 | $25,400 | 35,000 |
| Infrastructure | $47,200 | $117,800 | 233,000 |
| Web | $9,830 | $56,700 | 98,300 |

FIG. 4

APPLICATION SURVEY

| APP. ID | APP NAME | VERSION | H/W LOCATION | CRITICALITY | SCALABILITY | OUTAGE IMPACT | REQUIRED ACTIVE | CUSTOM |
|---------|----------|---------|--------------|-------------|-------------|---------------|-----------------|--------|
| HR | Lawson HR | 1.5 | AppSys1 | Mission Critical | Add Servers | Financial | 24x7 | No |
| Payroll | PeopleSoft | 1.0 | AppSys3 | N/A | HW Upgrade | None | Bus Hours | No |
| NetSys | EFS Forms | 2.2 | WebSys2 | Bus Critical | HW Upgrade | Network | 24x7 | No |

FIG. 5

FUTURE HARDWARE STATE

| SOURCE | APPLICATIONS | RETIRE SOURCE | APP FUTURE | TARGET |
|---|---|---|---|---|
| AppSys1 | App1 | Immed | Same | AppSys4 |
| | App2 | | Same | AppSys4 |
| | App3 | | Same | AppSys4 |
| AppSys2 | App4 | 6 months | Retire | N/A |
| | App5 | | Retire | N/A |
| | App6 | | Retire | N/A |
| WebSys1 | App7 | 2 months | Update | WebSys 4 |
| | App8 | | Replace | WebSys 4 |
| | App9 | | Update | WebSys 4 |

FIG. 7

COST AND TIME ESTIMATE FOR CONSOLIDATION

| Consolidation Task | | Estimated Cost | Estimated Time Requirement |
|---|---|---|---|
| Purchase New H/W | | $C_1$ | $T_1$ |
| Install New H/W | | $C_2$ | $T_2$ |
| Test New H/W | | $C_3$ | $T_3$ |
| Purchase New Apps | | $C_4$ | $T_4$ |
| Install New Apps | | $C_5$ | $T_5$ |
| Test New Apps | | $C_6$ | $T_6$ |
| Migrate Apps | | $\Sigma c_{Source(1)...Source(n)}$ | $\Sigma\, t_{Source(1)...Source(n)}$ |
| | Source 1 | $\Sigma c_{task(1)...task(i)}$ | $\Sigma t_{task(1)...task(i)}$ |
| | Source 2 | $\Sigma c_{task(1)...task(i)}$ | $\Sigma t_{task(1)...task(i)}$ |
| | Source 3 | $\Sigma c_{task(1)...task(i)}$ | $\Sigma t_{task(1)...task(i)}$ |
| | Source 4 | $\Sigma c_{task(1)...task(i)}$ | $\Sigma t_{task(1)...task(i)}$ |
| | ⋮ | | |
| | Source n | $\Sigma c_{task(1)...task(i)}$ | $\Sigma t_{task(1)...task(i)}$ |
| System Test | | $C_8$ | $T_8$ |
| Deployment | | $C_9$ | $T_9$ |
| TOTALS | | $\Sigma c_{1...9}$ | $\Sigma T_{1...9}$ |

FIG. 8

METHOD AND PROGRAM PRODUCT FOR CONSOLIDATING COMPUTER HARDWARE RESOURCES

REFERENCE TO RELATED APPLICATIONS

This application claims the benefit of U.S. Provisional Application Ser. No. 60/489,406, filed by Power, et al., on Jul. 23, 2003. This application also incorporates by specific reference (p. 22, para. [0057]) all embodiments of the method described in paragraphs [0037] to [0205] and FIGS. 1-19 of U.S. patent application Ser. No. 10/807,623, entitled "Method and Program Product for Costing and Planning the Re-Hosting of Computer-Based Applications," filed by Power, et al., with a filing date of Mar. 24, 2003.

BACKGROUND OF THE INVENTION

1. Technical Field of the Invention

The invention relates generally to the field of methods for consolidating computer hardware devices on which a plurality of computer-based applications are stored and/or operated. The invention relates more specifically to methods for determining a future state for hardware resources and their applications and for estimating the cost and time requirements for consolidating multiple hardware devices into fewer hardware devices.

2. Description of Related Art

The use of computer systems and applications greatly simplifies the storage and processing of data. Computer systems and applications enable businesses to reach certain economies of scale, by streamlining the cost, time and practicalities of handling large volumes of data. As a business grows, however, the use of specialized systems and applications among its separate units can cause the overall information technology (IT) devices of the business to become fragmented. The major result of fragmentation is the underutilization of hardware, such that each server or other hardware device is operated well below its capacity. Fragmentation also leads to other inefficiencies, such as duplicative licensing and installation of operating systems and applications; excessive use of electrical power; excessive staffing; and inefficient utilization and maintenance of other devices. These wastes are often prolonged by the tendency of each business unit to become entrenched in a particular operating system, group of applications, or computer hardware.

Advances in computer hardware have enabled businesses to combat certain inefficiencies. For example, new technologies allow for many images of an application or operating system to be operated on a single CPU. Other technologies allow for single hardware devices to operate as multiple virtual machines. Nonetheless, the costs of change often exceed simple purchase or licensing fees. By the time a significant advancement is made, each unit of a business may be mired within its use of antiquated technologies. Applications may need to be replaced or migrated to a different hardware environment, and then configured to interact with particular operating systems or other applications. This results in downtime for hardware devices and ramp-up periods for users. Hence, the cost-benefit ratio of changing hardware or other IT resources often forces a business to lose money by living with inefficiencies for an extended period of time.

If a business continues to grow, a point typically arrives when the cost of continuing inefficiencies outweighs the cost of consolidating or reconstituting a business' IT resources. A business must be able to determine when it reaches this condition, so that it need not waste money unnecessarily. While methods for updating and consolidating applications or hardware have grown, businesses have been unable to project the cost or time requirements for either solution within useful tolerances. Thus, businesses are prone to waste financial resources by significantly undershooting or overshooting the point when consolidation and updating becomes a cost-effective solution. Additionally, a business undergoing consolidation and updating often suffers from an inability to plan precisely for the interruption of its operations. This adds to the cost of consolidation and updating, forcing some businesses to undergo migration of applications either much sooner, or much later, than it becomes cost-effective.

U.S. Pat. No. 6,249,769, to Ruffin, et al., discloses and claims a method for matching the IT infrastructure needs of a business with a set of IT solutions, and generating a proposal for the solution that would most help the business. Data relating to the IT objectives of a business are collected via an interactive process and are sequentially analyzed using modeling tools. The IT infrastructure is partitioned into "islands" of closely-related elements. Each island is assigned a score that reflects the value of enhancing its elements, and the islands are ranked according to their scores. A solution service or product is then chosen for each island from a database of available solutions. A proposal, or "Business Solutions Assessment," is then generated for the enterprise by the provider.

While providing a valuable solution to IT fragmentation, the Ruffin invention has some limitations. First, the IT solution is selected from a database of pre-defined solutions. It is not customized to each individual enterprise. The patent states that its "process is fraught with a great degree of imprecision" and that a "customer engagement may result in failure for a variety of reasons including . . . applicability of [the provider's] solution portfolio . . . " (col. 6, lines 45-49). Any customization of a solution must be identified by the customer's technical staff, or the customer must engage the provider's staff to develop a customized solution (col. 6, lines 28-42). This adds time and cost to a project for the enterprise whose IT devices are being consolidated. An automated means for providing customized solutions would be more advantageous.

Additionally, while the Ruffin invention provides a general cost estimate for migrating applications during a server consolidation process, the cost estimate has a broad margin of error. The reason for this is that few factors are used to adjust cost, and these factors are applied to a migration as a whole. Factors affecting migration cost rarely affect every task during the migration of an application from one platform to another. For instance, the language factor disclosed in Ruffin (col. 21, line 38) may affect actual migration and some testing functions after migration, but it will not affect baselining, system building, data import, or data export tasks. Hence, adjusting the entire migration process by the language factor will cause the estimated cost to be significantly higher than the real cost. The more factors that are applied, the more the overestimation compounds. Migrations must be broken down into individual tasks to which factors are applied, in order to obtain a cost estimate that prevents overshooting the point where consolidation becomes cost-effective.

Finally, while Ruffin discloses a generalized method of cost estimation, it discloses no means for estimating the time required for a consolidation process. The time required is an integral portion of any solution, because downtime and service interruptions result in costs that only the customer can truly assess. It is imperative that the customer be able to prepare for a consolidation process that is started and ended within a precise timeframe. Ruffin again admits to imprecise implementation of a server consolidation process, stating that a "customer engagement may result in failure [due to] delays and misstarts in the project planning and implementation process." (col. 6, line 45-50). This may be remedied with an accurate estimate of the time required for the IT consolidation process.

As a result, there exists a great need in the art for a method for determining a customized future state for an enterprise's IT resources, and for accurately projecting the costs for updating and consolidating a plurality of applications from multiple server computers or other computer-based environments onto fewer server computers or other computer-based environments. The method must provide precise estimates for costs and should also accurately estimate time requirements for consolidation. Despite its production of customized solutions, the method must be automated and replicable, to ensure that it provides more consistently valuable assessments than non-automated, ad hoc plans and estimating methods.

SUMMARY OF THE INVENTION

The current invention provides a computer-implemented method for costing and planning the consolidation of multiple source server computers or other source computer hardware devices to fewer target server computers or other target hardware devices. The method provides steps for determining a customized future state for IT resources, and for estimating the costs and time requirements for implementing the customized solution. This includes, among the other functions described herein, estimating the costs and time requirements for replacing or relocating one or more computer-based applications during the consolidation process and for replacing, installing and configuring any new hardware devices. The invented method addresses the foregoing challenges and provides further advantages, by providing an automated method that may be implemented in a consistent manner with predictable and accurate outcomes.

The method comprises the steps of receiving identifications and attributes of a plurality of hardware devices; receiving identifications of a plurality of applications operated on the hardware devices; receiving at least one future state criterion; and determining a customized future hardware state. The future hardware state comprises a future IT configuration, wherein the attributes of all hardware devices meet every future state criterion, and all of the applications are replaced or operated on hardware devices meeting every future state criterion.

The method may also comprise steps of receiving attributes of the applications; comparing the attributes of each application with at least one replacement criterion; and determining a future application state, wherein applications not meeting any replacement criterion are operated on hardware devices meeting every future state criterion, each application meeting a replacement criterion is retired, and a new or updated version of each retired application is operated on a hardware device meeting every future state criterion. The invented method may also comprise outputting the future hardware state, future application state, or both.

The step of determining a customized future hardware state may be accomplished by sorting the hardware devices into source candidates (hardware devices not meeting every future state criterion) and target candidates (hardware devices meeting every future state criterion); comparing attributes of each source candidate with attributes of at least one target candidate; comparing usage on each source candidate with capacities of at least one target candidate; for each source candidate, determining a best target candidate whose attributes and capacities best match the attributes and usage of the source candidate; and determining source candidates whose attributes do not match attributes of any target candidate. The customized future hardware state then comprises the target candidates and at least one new hardware device for operating applications on source candidates whose attributes do not match attributes of any target candidate. The attributes of each new hardware device meet every future state criterion.

The steps for determining a future hardware state may also comprise receiving a life span of each application, and determining whether all applications on a source candidate have a life span shorter than a pre-defined life span. The future hardware state further comprises, then, source candidates, all of whose applications have a life span shorter than the pre-defined life span. Alternatively, all applications having a life span shorter than a pre-defined life span may be migrated onto at least one proxy hardware device, and the future hardware state further comprises each proxy hardware device.

The invented method may also comprise estimating at least one cost of implementing the future hardware state. Estimating a cost may be achieved by receiving identifications of respective migration tasks; correlating base costs to respective ones of said migration tasks; receiving identifications of migration attributes that affect migration cost; correlating cost factors to respective ones of said migration tasks, each of the cost factors indicating an amount by which a migration attribute affects the base cost of a migration task; and estimating a cost for each migration task, by applying the cost factors for each migration task to the base cost of the migration task. A total cost for implementing the future hardware state may be estimated by summing the estimated costs of all migration tasks.

The step of estimating at least one cost of implementing the future hardware state may also comprise correlating base time requirements to respective ones of said migration tasks; correlating time factors to respective ones of said migration tasks, each time factor indicating an amount by which a migration attribute changes the base time requirement for a migration task; and estimating a time requirement for each migration task, by applying all time factors for the migration task to the base time requirement for the migration task. A total time requirement for implementing the future hardware state may be estimated by summing the estimated time requirements of all migration tasks.

The invented method may also comprise calculating a cost savings for consolidating the hardware devices. The invented method may also comprise outputting at least one cost chosen from a group consisting of the costs of each migration task, the time requirements of each migration task, the total cost and the total time requirement.

Individual aspects or functions of the invented method may be embodied in computer-readable program products. Hence the current invention is also directed to computer-readable program code means for implementing and executing the steps of the methods disclosed, in a manner that will be readily known to those skilled in the art.

BRIEF DESCRIPTION OF THE DRAWINGS

FIG. 2 is a table illustrating one example embodiment of a hardware survey, in accordance with the present invention.

FIG. 3 is a table illustrating a second example embodiment of a hardware survey, in accordance with the present invention.

FIG. 4 is a table illustrating one example embodiment for representing average cost by hardware category, in accordance with the present invention.

FIG. 5 is a table illustrating one example embodiment of an application survey, in accordance with the present invention.

FIG. 7 is a table illustrating an embodiment for displaying or printing a future hardware state, in accordance with the present invention.

FIG. 8 is a table illustrating an example embodiment for returning a cost and time requirement estimate, in accordance with the present invention.

DETAILED DESCRIPTION OF THE INVENTION

Figure 1:
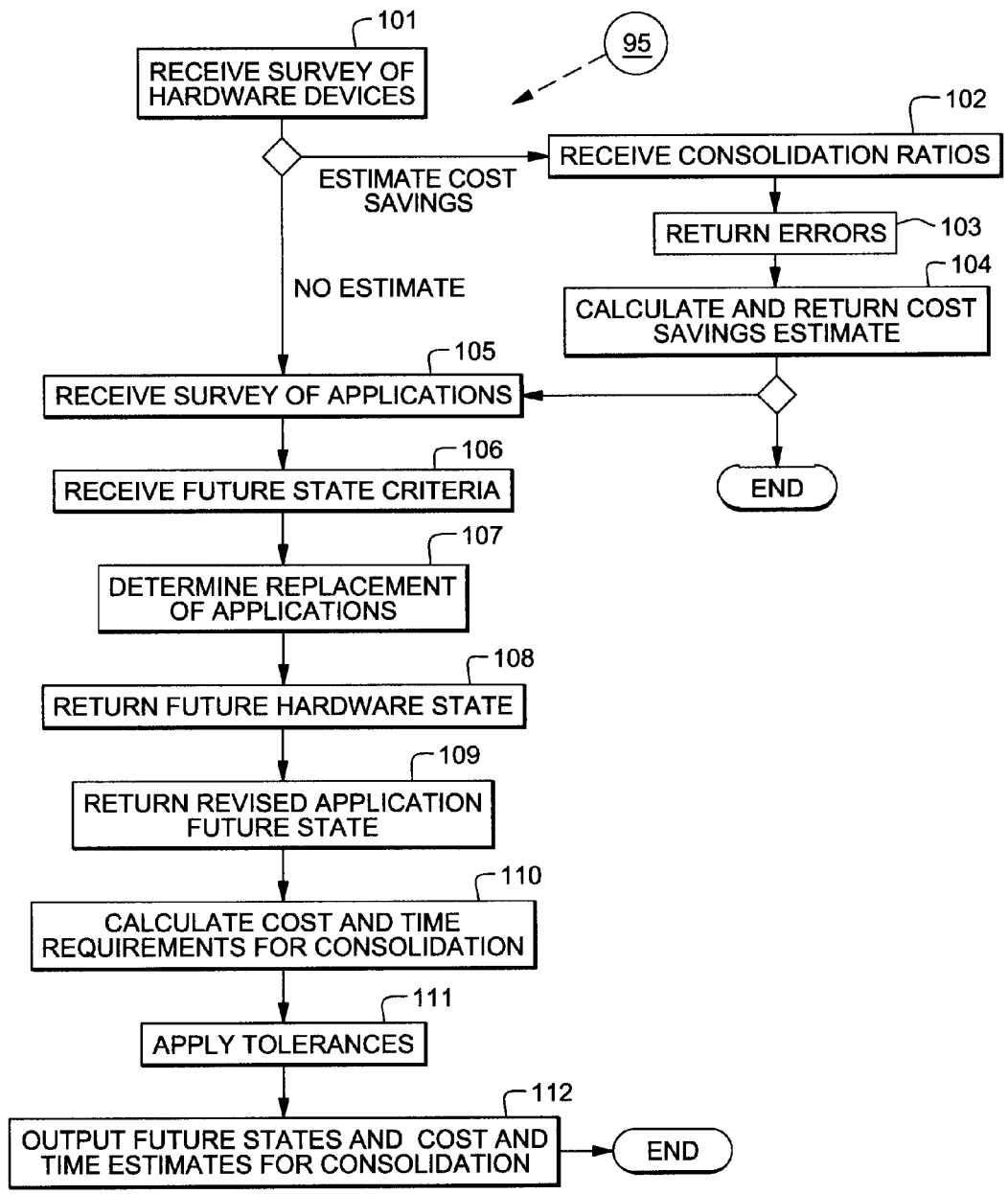
FIG. 1 is a flow diagram illustrating steps of a method, wherein future states and cost and time estimates are returned for consolidating multiple source hardware devices to fewer target hardware devices, in accordance with the current invention.

Referring now to the drawings, the invention is directed to a computer-implemented method for costing and planning the consolidation of computer hardware devices. The individual steps of the method are executed by at least one computer software program embodied on a computer-readable storage media 95 such as portable magnetic disk or semiconductor memory, or magnetic disk or semiconductor memory internal to a computer, without regard to the operating system of the computer or the language of the software programs. It will be appreciated by those skilled in the art that some steps of the method may be performed in series, and some in parallel or in series. Additionally, the order of the steps may in some instances be changed, without departing from the scope or advantages of by the current invention. The order of steps disclosed herein is given for ease of explanation.

FIG. 1 is a flow diagram illustrating steps of the invented method. In accordance with step 101, a survey of hardware devices is received. The hardware survey identifies the hardware devices that are to be consolidated. Hardware devices may include, for example, server computer, mainframe computer, or other hardware device that is susceptible of operating multiple applications for the benefit of multiple users. The identification of each hardware device may comprise one or more identifying indicia, such as a user-defined number, name or character string that is assigned to each hardware device. The hardware survey also contains the manufacturer/vendor model name and serial number, if any, of each hardware device identified in the hardware survey. The hardware survey also includes the IP address of each hardware device, if any.

The survey of hardware devices also includes the physical and logical capacities of each hardware device. Physical capacities may comprise, for example, total internal and external memory in each hardware device and disk or drive space availability and usage in each hardware device. Logical capacities may comprise, for example, the total and available number of operating system images or partitions that may be operated on a device.

The survey of hardware devices also includes functional attributes of each hardware device identified in the survey. Hardware functional attributes may include the primary function of each hardware device, such as web access, online transaction processing, application utilization, database storage and operation, file and print, systems management, infrastructure or other functions. Where hardware devices in an enterprise are arranged in uniform layers among functional categories, the functional attributes of a hardware device may be represented as two or more functional characteristics, such as web layer for online services; application layer for intranet services; database layer for peoplesoft; or the like.

The survey of hardware devices also includes technical attributes of each hardware device identified in the survey. Hardware technical attributes include internal components and capacities, such as the quantity and speeds of the central processing units (CPUs) used to control each hardware device and the amount of random access memory (RAM) in each hardware device. Hardware technical attributes also include operating attributes of each hardware device, such as the types and versions of operating systems and databases used on each hardware device; peak and average utilization percentages for each hardware device; and the network load among the hardware devices as a whole, or by functional category (described above). The hardware technical attributes also include the organizational or logical affinity of each hardware device for applications having certain characteristics, such as particular high-level languages, or functions, such as calculation, production, development, or quality assurance. The hardware technical attributes also include transaction processing rates for each hardware device, such as transactions per minute-C (tpmC) or price-per-tpmC.

The survey of hardware devices also includes financial attributes, such as a description of whether the hardware device is purchased, leased, financed, or other indications of ownership. Where a hardware device is leased or financed, the origination and expiration dates of the lease or finance agreement are received. The financial attributes also include average costs per period for operating each hardware device on a quarterly, semi-annual, or yearly basis over a pre-defined or user-defined number of prior time periods. Average costs period represent all cost variables for operating hardware devices over a time period, including power consumption costs; costs from hardware leasing or financing contracts; costs from operating system licensing and updating; costs from updating components, such as processor cards, memory and the like; media costs for backing up, archiving or otherwise transferring files or programs; cost of peripherals; maintenance and support costs; costs from network management; cost of operations staff; physical space costs, if any; and other costs associated with operating the physical hardware devices identified above.

The average costs per period are preferably grouped into categories, which may be defined by ranges of hardware attributes. For instance, average costs per period could be grouped according to ranges in the size, capacity or number of processors of various hardware devices. As shown in FIG. 4, separate average quarterly costs experienced over the past six quarters may be received for server computers having one to two processors; for server computers having three to six processors; and for server computers having more than six processors. In another example, average semi-annual costs over the past two years may be received for all infrastructure hardware; for all database hardware; for all web hardware; for all web payer hardware used for intranet services; and for other functional categories.

The average costs received for various categories are accompanied by a percentage, fraction or proportion indicating the amount of such costs that are fixed, i.e., the costs that do not rise with the addition of additional units of hardware devices in the relevant category. Alternatively, an average fixed cost percentage may be received for hardware devices as a whole, irrespective of category. Percentages of fixed costs may alternatively be received both by category of hardware and overall.

The hardware financial attributes may also include current book value of each hardware device and depreciation rate by term, such as monthly depreciation or the like.

The survey of hardware devices also includes the positioning of each hardware device within an enterprise. Enterprise positioning may include physical location of each hardware device within the enterprise's facilities or business units and the existence and/or description of any service level agreement (SLA) for users of various business units to use a particular hardware device. The survey of hardware devices may also include the installation date of each hardware device. The survey of hardware devices may also include the backup methods used for each hardware device.

The hardware device survey may take the form of a table, or series of tables, as represented in FIGS. 2 and 3.

A user may elect to calculate a cost savings that will be realized from consolidating the hardware devices, according to steps 102-104. If a cost savings estimate is to be returned, then at least one consolidation ratio is received, in accordance with step 102. A physical consolidation ratio comparing the number of current hardware devices to the target number of hardware devices after consolidation is received. A logical consolidation ratio comparing the number of current operating system (OS) images operating on current hardware devices to the target number of OS images to be operated on target hardware devices after consolidation is also received.

The target consolidation ratios may also include separate ratios for user-defined categories of physical hardware devices and OS images. For example, the overall physical consolidation ratio may be received along with separate ratios for physical consolidation of database hardware devices; application hardware devices; web hardware devices; file and print hardware devices; systems management hardware devices; and infrastructure hardware devices. Likewise, the overall logical consolidation ratio may be received along with separate ratios for consolidating OS images operating on database hardware devices; application hardware devices; web hardware devices; file and print hardware devices; systems management hardware devices; and infrastructure hardware devices. Any target consolidation ratio may be received as a range, which extends from the most conservative acceptable consolidation ratio to the most aggressive acceptable consolidation ratio. For example, a target consolidation ratio for web hardware devices may be received in the form 4:1-6:1 or 4-6:1, wherein the consolidation ratio represents a target consolidation from between four and six hardware devices to one hardware device.

In accordance with step 103, errors may be returned for the target consolidation ratios. Errors may indicate that the target consolidation ratios are unrealistic, given limitations in technology, such as memory capacity, numbers of possible terminals or users, or other limitations of computer hardware devices. If errors are returned, then new target consolidation ratios are received and examined for errors.

Once the target consolidation ratios are received without errors being returned, a cost savings estimate is calculated for the consolidation of hardware devices and returned, in accordance with step 104. The estimated cost savings per period ($CSE_{hw}$) for any category (hw) of hardware devices is calculated based upon the formula:

$$CSE_{hw} = [A_{hw} - k_{hw}A_{hw}] - \frac{[A_{hw} - k_{hw}A_{hw}]}{R_{hw}}$$

(wherein $A_{hw}$ equals the pre-consolidation average cost per period for hardware devices in category 'hw'; $k_{hw}$ equals the percentage of $A_{hw}$ which is fixed; and $R_{hw}$ equals the target consolidation ratio for the category 'hw' of hardware devices).

Those skilled in the art will appreciate that the formula given above may be represented differently, where individual elements of the equation are represented differently. For example, where the target consolidation ratio is given using the target number of hardware devices first, and the number of source hardware devices second (e.g., 1:5-7), then the numerator in the formula above would be multiplied by $R_{hw}$, rather than divided by it. Where average cost per period, fixed costs, and consolidation ratio(s) are given irrespective of categories, the 'hw' designator is unnecessary or indicative of all hardware devices. Additionally, where consolidation ratios were received as ranges in step 102, a range of cost savings estimates may be calculated therefrom. The cost savings estimate may be calculated as a negative number, instead of the positive number represented in the above formula, where such number would help to demonstrate the negative impact of consolidation upon current costs per period.

Where average cost per period, fixed costs, and consolidation ratios have been given according to separate categories, an overall cost savings estimate may be calculated by summing $CSE_{hw}$ for all categories of hardware devices. The cost savings estimate may be returned in multiple forms, such that both a cost savings per period for total hardware devices and for each category of hardware devices for which target consolidation ratios were received in step 102.

Where a cost savings estimate has been returned, a user may decide to end the costing and planning method or to proceed. For example, a user may speculate that the cost savings estimate is likely to be insufficient compared with the cost of consolidation, and that consolidation should thus be postponed.

Where a user decides to continue with the costing and planning of consolidation after the cost savings estimate is returned, or where a cost savings estimate is not desired, an application survey is received in accordance with step 105. The application survey includes identifications of each application that is operated on those hardware devices identified in the hardware survey. Identifications may comprise the name and version of each application; a control number or other identifying indicia assigned to each application by the business; or other appropriate identifiers. The application survey also includes the primary function of each application and (if more than one function) its component parts, such as production control; batch processing; data mining; online transaction processing (OLTP); or other functions. The application survey also includes the hardware device on which each application is currently operated. The manner of designating each source hardware device preferably matches the manner in which the source hardware was identified in the hardware survey received in step 101.

The application survey also includes other application attributes that impact the consolidation of a particular application with others. For example, application attributes include whether the application is real-time; scalable; mission or business critical; or interactive. Application attributes may also include the required availability of each application and the impact of outages or downtime. Application attributes also include the languages used in each application; the number of lines of source code; and total number of lines of code of each application, as determined by a code metric utility or other suitable means. Application attributes may also include whether each application is common, uncommon; custom-made; or a third party product (COTS). Application attributes may be expressed in descriptive form, or they may be expressed as yes-no (or other analogous binary system) indicators of pre-defined attributes for which a user is prompted in completing the application survey. An application survey may be received as one or more tables, such as that shown in FIG. 5.

Those skilled in the art will appreciate that the cost savings estimation performed in steps 102-104 may be performed after the application survey is received. The primary goal of the estimate is to allow a user or customer to determine whether to proceed with planning and implementing a future hardware state.

In accordance with step 106, future hardware state criteria are received. Future hardware state criteria may comprise any criteria suitable for defining the goals of consolidating an enterprise's hardware devices. For example, future hardware state criteria may comprise target physical and/or logical consolidation ratios, such as those described with respect to step 102. Future hardware state criteria may also comprise target utilization percentages for each hardware device; target network loads; or growth allowances. Future hardware state criteria may also comprise reduction of maintenance and support staff; reduction in lease or financing commitments; reduction in space requirements; reduction in average costs per period or reductions in specific costs, such as utility costs; increases in tpm-C; reduction in media costs or peripherals; increases or decreases in the ration of fixed IT costs to overall IT costs; or increases or decreases in the number of SLAs. Future hardware state criteria may also comprise eliminating or consolidating IT resources in individual functional categories; eliminating or consolidating IT resources that do not use one or more specified operating systems or databases; eliminating or consolidating IT resources that have specified logical affinities; or other suitable criteria. Criteria must correspond to information received in the hardware survey in step 101. Multiple criteria may be received, along with priorities for ranking the multiple criteria. For example, criteria may comprise a first goal of reducing the number of hardware lease contracts, a second goal of consolidating hardware devices having low capacities, and a third goal of supporting time critical or mission-critical applications that do not fit into either of the two categories.

In accordance with step 107, application replacement criteria are received. Application replacement criteria may include a determination of which applications that are near the end of their life spans, such that they will be replaced with updated versions or altogether different applications during consolidation. The determination may be made in accordance with pre-defined criteria, such as whether a new version is expected within six months or less; whether the application is unstable or functionally antiquated; or other criteria militating in favor of replacing or updating each application. The determination of the life spans of applications may also be projected, using calculations similar to those used to obtain actuarial statistics. Alternatively, a user may submit choices of applications to update or replace along with the application survey or after separate prompting.

In accordance with step 108, a customized future state for hardware devices and applications is returned. The future hardware state may be comprised of current hardware devices that are reconfigured to achieve the future hardware state. Alternatively, the future hardware state may be comprised of new hardware devices that replace one or more current hardware devices. Alternatively, the future hardware state may be comprised of some current hardware devices and some new hardware devices. In the preferred embodiment of the invention, the inclusion of current and new hardware devices in the future hardware state is defined by a user prior to the determination of the future hardware state. This definition may designate, for example, "all current hardware devices," "all new hardware devices," "both new and current hardware devices," "no more than x % new hardware devices," and the like.

One embodiment of a method for determining a customized future hardware state is described in detail with reference to FIG. 6, below. Nonetheless, those skilled in the art will appreciate that there are many means for determining a customized future hardware state. For purposes of costing and planning a consolidation, the manner of determining the future hardware state is not critical, so long as the future hardware state is returned in a useful and particularized form. The future hardware state may comprise a pictorial representation or a list or set of hardware devices, such as that shown in FIG. 7. Such a list may be given as a single unit, or multiple lists may be given, each list representing a functional group of future hardware devices, such as web, database, file and print, application utilization, and the like.

The future hardware state should designate currently used hardware devices using the identifiers given in the hardware survey. The future hardware state may also list manufacturer names and model numbers, as well as pertinent technical attributes for each hardware device, such as number of processors, number of logical partitions, memory capacity, and the like. For new hardware devices, the future hardware state may list manufacturer names and model numbers, as well as pertinent technical elements of each new hardware device. The list or set may also include and designate hardware devices that will accommodate enterprise growth over a time period.

In conjunction with the future hardware state, a future state for applications may also be determined and returned, in accordance with step 109. The future application state comprises the projected distribution of applications among all hardware devices after consolidation. The future application state identifies each application and indicates whether it will remain on its current hardware; whether it will replaced by updated versions or alternate applications; and which target hardware, if any, will receive the application or its replacement. In order to prevent excessive reshuffling of applications among hardware devices, the future application state preferably complies with the source-target combinations determined in the future hardware state.

In accordance with step 110, the costs for achieving the future hardware state and future application state are estimated. The costs, if any, of purchasing, installing, testing and configuring new hardware devices contained in the future hardware state are determined. Additionally, the costs, if any, of purchasing, installing, testing and configuring new or updated applications contained in the future application state are determined. Additionally, the costs of migrating currently used applications from source hardware devices to target hardware devices, pursuant to the future application state, are determined.

The time requirements for achieving the future hardware and application states are also determined. The time requirements, if any, of installing, testing and configuring each hardware device contained in the future hardware state are determined. Additionally, the time requirements, if any, for physically installing, testing and configuring new or updated applications contained in the future application state are determined. Additionally, the time requirements for migrating applications from source hardware devices to target hardware devices, pursuant to the future application state, are determined.

The means used for calculating migration costs and time requirements preferably assess costs and time requirements for individual migration tasks. Because not all factors in a migration process will affect every migration task, summing the costs and time requirements for individually assessed migration tasks provides the most accurate means for estimating the cost and time for the migration process, as a whole. The costs and time requirements of migrating applications is preferably determined according to the methods described in paragraphs [0037] to [0205] and FIGS. 1-19 of U.S. patent application Ser. No. 10/807,623, entitled "Method and Program Product for Costing and Planning the Re-Hosting of Computer-Based Applications," filed by Powers and Galloway as of Mar. 24, 2003 (the "Re-Hosting Application).

The variables used for the estimating methods in the Re-Hosting Application may be collected in connection with steps 101 and 105, above. For example, additional data relating to the hardware environment of each hardware device, such as connectivity or other hardware and environment variables disclosed in the Re-Hosting Application, may be collected within the hardware survey. Likewise, additional application attributes, such as operating system dependency and other variables disclosed in the Re-Hosting Application, may be collected within the application survey. Preferably, all variables disclosed in the Re-Hosting Application may be gathered after the future hardware state and future application state have been determined, in order to prevent unnecessary data gathering for applications that will not be migrated due to replacement or updating.

Once the costs and/or time requirements for consolidation are calculated, tolerances may be applied, in accordance with step 111. Tolerances may be pre-defined or user-defined, in order to return cost and time requirement estimates of varying accuracy and leeway. Tolerances may be selectively applied to costs for new hardware or upgraded or new applications, for example, such that the tolerances for migration disclosed in the Re-Hosting Application are not expanded or duplicated.

Finally, in accordance with step 112, an assessment containing the future hardware and application states and total costs and time requirements for consolidation is output. The estimates may comprise fixed numbers or ranges. The assessment may also contain cost and/or time requirement estimates for individual consolidation tasks, which estimates may be fixed numbers, ranges, or a combination of fixed numbers and ranges. The estimates may be returned in tabular form, such as that shown in FIG. 8.

Figure 6:
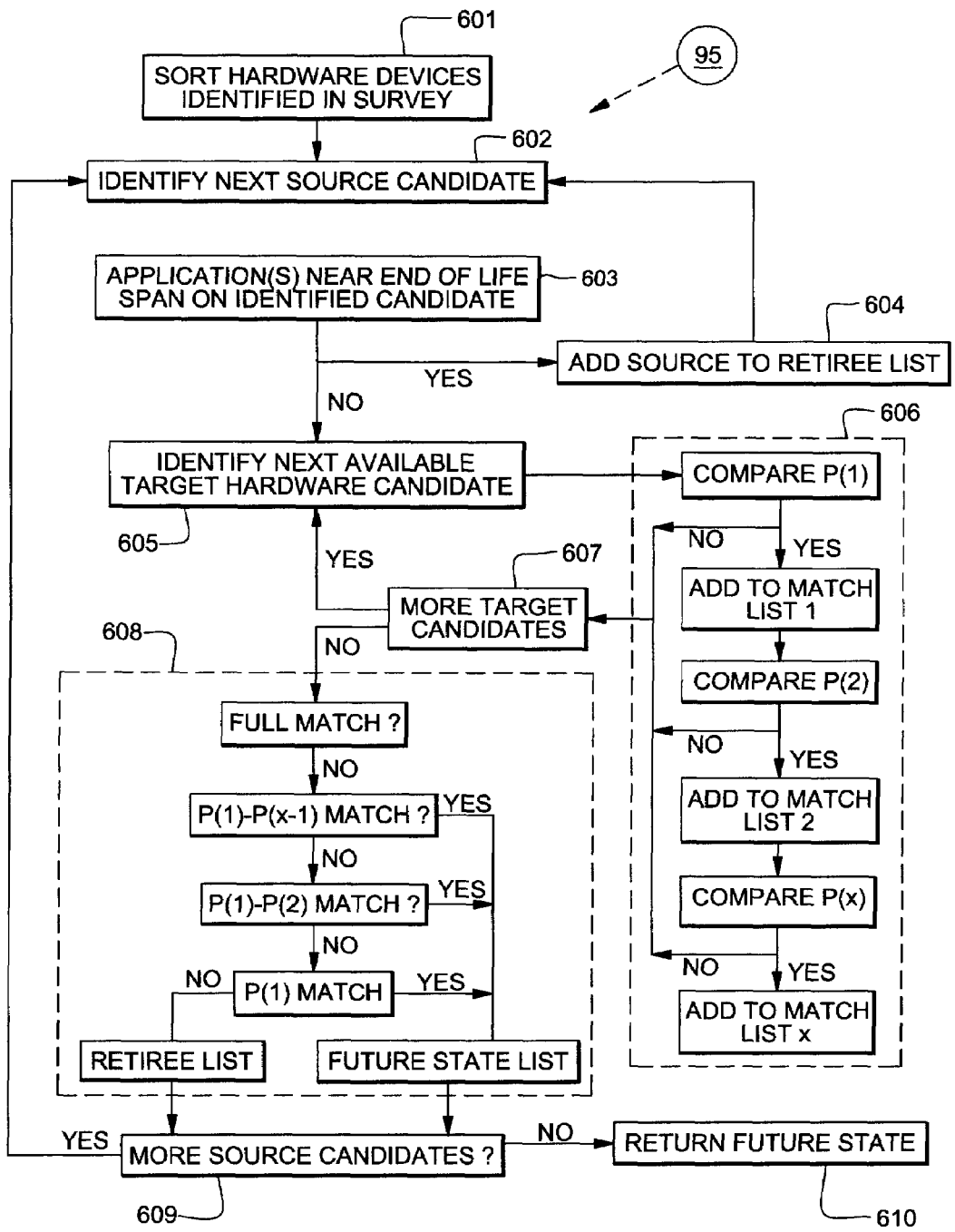
FIG. 6 is a flow diagram illustrating one embodiment of a method for determining a future hardware state, in accordance with the present invention.

FIG. 6 is a flow diagram illustrating steps for determining a future hardware state, in accordance with the present invention. The basic goal of consolidation is to consolidate applications and data that operate and reside on hardware devices having low utilization percentages onto fewer like hardware devices that have sufficient capacity to operate and store the applications and data. Nonetheless, determination of the hardware devices used after consolidation need not be based strictly on capacity. As described with respect to step 106, above, many different criteria may be used and attached to priority rankings. For example, an enterprise may operate many hardware devices of the same capacities, all having low utilization. However, some of the devices may be under leases that are set to expire much sooner than the others. The criteria for consolidation, then, would be consolidation of applications and data residing on hardware devices whose leases will soon expire to those hardware devices that have a longer remaining lease term. Alternatively, the enterprise could consolidate all leased hardware to hardware that the enterprise owns. Those skilled in the art will appreciate that other criteria may be used to determine and prioritize hardware in an optimum future hardware state, based on an individual enterprise's goals.

The following description sets forth an example embodiment for determining a future hardware state, in accordance with the present invention. It will be appreciated by those skilled in the art that the embodiment, while describing multiple prioritized criteria, may be applied to the simpler case where more or fewer than criteria are received.

In accordance with step 601, hardware devices identified in the hardware survey are grouped into categories based upon whether they meet all parameters indicated by the future state criteria given in step 102 or 106. For example, where the future state criteria received in step 106 are:

PRIORITY 1: Lease expiration or max depreciation>1 year away

PRIORITY 2: Peak utilization>50% capacity

PRIORITY 3: Peak utilization+Projected growth<95% capacity, hardware devices are categorized according to whether they meet all future state criteria or less than all future state criteria. Hardware devices that do not meet all criteria are referred to as "source candidates" and are further sorted by whether they fail to meet the highest priority future state criterion; whether they meet the highest priority future state criterion but not the second; and whether they only fail to meet the lowest priority and future state criterion. Hardware resources that meet all future state criteria are referred to as "target candidates."

Source candidates are analyzed one at a time and paired with target candidates. In accordance with step 602, a source candidate is identified. Source candidates should be identified in order of the priority of the criteria that they do (or do) not meet. In the current example, hardware devices having less than one year remaining on their leases, or less than one year until they are fully depreciated, are the first to be identified as source candidates and paired to target candidates. Next, any remaining hardware devices whose peak utilization is less than fifty percent (50%) capacity are identified as source candidates and paired to target candidates. Finally, any remaining hardware devices whose peak utilization and projected growth equals more than ninety-five percent (95%) of capacity are identified as source candidates and paired to target candidates. Because those hardware devices not meeting the highest priority future state criteria are matched with target hardware devices first, it is more likely that those devices will be matched with target devices having the capacities to accommodate their contents.

In accordance with step 603, it is determined whether the application(s) operated on the current source candidate are near end of their life spans. This determination may be made according to the means used or results given in step 107, above. If all applications operated on the source candidate identified in step 603 are near the end of their life spans, then the source candidate is added to a retiree list, in accordance with step 604. Hardware devices listed on the retiree list may continue to be operated until the life spans of their applications cease, at which time the hardware will no longer be used. Alternatively, the applications residing on all hardware devices on the retiree list may be consolidated to a temporary hardware device, such that the source candidates listed on the retiree list may be retired immediately at the end of the overall consolidation process. Whether hardware on the retiree list is operated or consolidated after consolidation will depend upon the cost and time for migration versus the power, maintenance and other costs of continued operation through retirement.

If fewer than all applications operated on the source candidate identified in step 602 are near the end of their life spans, then a target hardware candidate is identified in accordance with step 605. Each target candidate comprises a hardware device that meets all priority criteria. Once a target candidate is identified, an iterative comparison of the source candidate with each target candidate is performed, in accordance with routine 606. This process compares the attributes of the source candidate with those of each target candidate. The attributes were received in the hardware survey, in accordance with step 101. Attributes should be prioritized, such that, if at any time an attribute does not match between the source and target candidates, the comparison process ends with the current target candidate.

In accordance with routine 606, a first attribute P(1)—for example, workload—is used to compare the source and target candidates. If the workloads match within certain tolerances, then the target candidate is added to Match List 1, which lists target candidates whose workloads match the source candidate. Then, a next attribute P(2), such as software combinations or affinities, for example, is compared between the two candidates. If the two candidates match within certain tolerances, then the target candidate is added to Match List 2, which lists target candidates whose workloads and software combinations or affinities match the source candidate. So long as attributes continue to match, this process is performed through parameter P(x) and Match List (x).

Once the comparison process for the current target candidate is completed, it is determined whether there are more target candidates to compare with the current source candidate, in accordance with step 607. If so, the next target candidate is identified, and the comparison process of routine 606 is performed for that target candidate.

If there are no more target candidates to compare with the source candidate, then the placement of the source candidate in the future state is determined, in accordance with routine 608. The match list(s) are reviewed to determine the extent to which any target candidate matches the source candidate's attributes. First, it is determined whether there are any target candidates listed on match list x, which lists target candidates matching all attributes of the source candidate within specified tolerances. If any target candidates are listed on Match List x, the physical and logical capacities of each target candidate on Match List x are examined until a target candidate is identified that can accommodate the physical and logical usage of the source candidate. The first target candidate that can accommodate the source candidate is related to the source candidate, and they are added to the future state list as a source-target combination.

Where no full matches having the requisite physical or logical capacities can be identified on Match List x, Match List (x−1) is reviewed for target candidates matching all parameters except parameter P(x). If any target candidates are listed on Match List (x−1), the physical and logical capacities of each target candidate on the match list are examined until a target candidate is identified that can accommodate the physical and logical usage of the source candidate. The first target candidate that can accommodate the source candidate is related to the source candidate, and they are added to the future state list as a source-target combination.

Where no such matches are identified, this process is performed until Match List 1 is reviewed for target candidates. If any target candidates are listed on Match List 1, the physical and logical capacities of each target candidate on the match list are examined until a target candidate is identified that can accommodate the physical and logical usage of the source candidate. The first target candidate that can accommodate the source candidate is related to the source candidate, and they are added to the future state list as a source-target combination.

If any target candidate is added to the future state list in combination with a source candidate, the physical and logical capacities of the target candidate are updated to reflect the effect of migrating the source candidate's applications to the target candidate. If no target candidate is added to the future state list in combination with a source candidate, the source candidate is added to the retiree list.

Upon completion of routine 608, it is determined whether any other source candidates exist, in accordance with step 609. If so, the next source candidate is identified in accordance with step 602, and steps 603-609 are repeated until all source candidates are exhausted.

Those skilled in the art will appreciate that matching source and target candidates may be performed through other means than that described above. For instance, separate match lists may be used for each parameter and a review made to determine whether any target candidate is present on all match lists. Alternatively, a point system can be used, whereby each target candidate is given a pre-defined number for each of its attributes that match the source candidate. In such a process, the number of points per attribute could be varied to reflect priority. The target candidate having the highest point total and the requisite physical and logical capacities would then be matched to the source candidate.

The future hardware state is then returned, in accordance with step 610. The future hardware state may show only the hardware devices remaining after consolidation. Alternatively, the future hardware state may show the source-target combinations from the future state list, along with the target hardware devices on which the source candidate's applications will be operated. The retiree list of hardware devices (or any temporary device) and the applications operated thereon are also included as part of the future state. As described with respect to FIG. 1, the future state for hardware and applications may be presented in at least one list/set form, or at least one diagram, or both.

The current invention is also directed to at least one computer program embodied on computer-readable media incorporating the methods described herein. Those skilled in the art will recognize that the method may be encapsulated in a single program. Alternatively, elements of the method, such as returning a future hardware state, comparison of parameters, determining matches, metering lines of code, and other functions may be performed by individual software "tools." Those skilled in the art will appreciate the means for embodying such logic within automated tools, such as a computer-based program or application.

What is claimed is:

1. A computer-implemented method for consolidating servers of an enterprise, said method comprising the steps of:
a computer determining a first plurality of servers of the enterprise, each server of the first plurality having (i) a peak utilization less than a predetermined percentage of its capacity or (ii) a lease set to expire or a substantially full depreciation within a predetermined period, and having a respective application installed therein;
the computer determining a second plurality of servers of the enterprise, each server of the second plurality having (i) a peak utilization greater than the predetermined percentage of its capacity and (ii) a lease set to expire or a substantially full depreciation after the predetermined period, and having a respective application installed therein;

the computer determining and recording a schedule for retiring a first server of the first plurality based in part on a projected lifespan of the application installed in the first server;

the computer determining, for a plurality of other servers of the first plurality, corresponding servers of the second plurality which have the respective applications and capacity to handle workload of the respective other servers of the first plurality, and recording and displaying identities of the other servers in association with the respective, corresponding servers; and the computer determining and recording a cost savings resulting from consolidation of the workload of the other servers onto the corresponding servers.

2. The method of claim 1 further comprising the steps of:

the computer determining, based in part on estimated time for testing and configuring the applications of the corresponding servers of the second plurality to handle workload of the respective other servers of the first plurality, an approximate schedule to migrate the workload of the plurality of other servers of the first plurality to the corresponding servers of the second plurality, and the computer recording and displaying the approximate schedule.

3. The method of claim 2 further comprising the step of the computer determining and recording a second server of the first plurality for which there is no server of the second plurality having the application of the second server and capacity to handle the workload of the second server.

4. The method of claim 1 further comprising the steps of:

the computer determining and recording a schedule for replacing a second server of the first plurality with another server based in part on an estimated time for installing, testing and configuring the application of the second server in the other server, and wherein there is no available server of the second plurality with the application of the second server and sufficient capacity to handle the workload of the second server.

5. The method of claim 1 further comprising the step of migrating the workload of the other servers to the corresponding servers.

6. A computer program product for consolidating servers of an enterprise, said computer program product comprising:

a computer readable storage media;

first program instructions to determine a first plurality of servers of the enterprise, each server of the first plurality having (i) a peak utilization less than a predetermined percentage of its capacity or (ii) a lease set to expire or a substantially full depreciation within a predetermined period, and having a respective application installed therein;

second program instructions to determine a second plurality of servers of the enterprise, each server of the second plurality having (i) a peak utilization greater than the predetermined percentage of its capacity and (ii) a lease set to expire or a substantially full depreciation after the predetermined period, and having a respective application installed therein;

third program instructions to determine and record a schedule for retiring a first server of the first plurality based in part on a projected lifespan of the application installed in the first server, the projected lifespan being less than a predetermined period;

fourth program instructions to determine, for a plurality of other servers of the first plurality, corresponding servers of the second plurality which have the respective applications and capacity to handle workload of the respective other servers of the first plurality, and record and display identities of the other servers in association with the respective, corresponding servers; and fifth program instructions to determine and record a cost savings resulting from consolidation of the workload of the other servers onto the corresponding servers; and wherein the first, second, third, fourth and fifth program instructions are stored on the computer readable storage media.

7. The computer program product of claim 6 further comprising:

sixth program instructions to determine, based in part on estimated time for testing and configuring the applications of the corresponding servers of the second plurality to handle workload of the respective other servers of the first plurality, an approximate schedule to migrate the workload of the plurality of other servers of the first plurality to the corresponding servers of the second plurality, and record and display the approximate schedule; and wherein the sixth program instructions are stored on the computer readable storage media.

8. The computer program product of claim 6 further comprising:

sixth program instructions to determine and record a schedule for replacing a second server of the first plurality with another server based in part on an estimated time for installing, testing and configuring the application of the second server in the other server, and wherein there is no available server of the second plurality with the application of the second server and sufficient capacity to handle the workload of the second server; and wherein the sixth program instructions are stored on the computer readable storage media.

9. The computer program product of claim 6 further comprising:

sixth program instructions to determine and record a second server of the first plurality for which there is no server of the second plurality having the application of the second server and capacity to handle the workload of the second server; and wherein the sixth program instructions are stored on the computer readable storage media.

10. A computer program product for consolidating servers of an enterprise, said computer program product comprising:

a computer readable storage media;

first program instruction means for determining a first plurality of servers of the enterprise, each server of the first plurality having (i) a peak utilization less than a predetermined percentage of its capacity or (ii) a lease set to expire or a substantially full depreciation within a predetermined period, and having a respective application installed therein;

second program instruction means for determining a second plurality of servers of the enterprise, each server of the second plurality having (i) a peak utilization greater than the predetermined percentage of its capacity and (ii) a lease set to expire or a substantially full depreciation after the predetermined period, and having a respective application installed therein;

third program instruction means for determining and recording a schedule for retiring a first server of the first plurality based in part on a projected lifespan of the application installed in the first server;

fourth program instruction means for determining, for a plurality of other servers of the first plurality, corresponding servers of the second plurality which have the respective applications and capacity to handle workload of the respective other servers of the first plurality, and recording and displaying identities of the other servers in association with the respective, corresponding servers; and fifth program instruction means for determining and recording a cost savings resulting from consolidation of the workload of the other servers onto the corresponding servers; and wherein the first, second, third, fourth and fifth program instruction means are stored on the computer readable storage media.

11. The computer program product of claim 10 further comprising:

sixth program instruction means for determining, based in part on estimated time for testing and configuring the applications of the corresponding servers of the second plurality to handle workload of the respective other servers of the first plurality, an approximate schedule to migrate the workload of the plurality of other servers of the first plurality to the corresponding servers of the second plurality, and recording and displaying the approximate schedule; and wherein the sixth program instructions are stored on the computer readable storage media.

12. The computer program product of claim 10 further comprising:

sixth program instruction means for determining and recording a schedule for replacing a second server of the first plurality with another server based in part on an estimated time for installing, testing and configuring the application of the second server in the other server, and wherein there is no available server of the second plurality with the application of the second server and sufficient capacity to handle the workload of the second server; and wherein the sixth program instructions are stored on the computer readable storage media.

13. The computer program product of claim 10 further comprising:

sixth program instruction means for determining and recording a second server of the first plurality for which there is no server of the second plurality having the application of the second server and capacity to handle the workload of the second server; and wherein the sixth program instructions are stored on the computer readable storage media.

14. The computer program product of claim 10 wherein the projected lifespan of the application of the first server is less than a predetermined period based on projected obsolescence of the application of the first server.

* * * * *

UNITED STATES PATENT AND TRADEMARK OFFICE
CERTIFICATE OF CORRECTION

PATENT NO. : 7,616,583 B1 Page 1 of 1
APPLICATION NO. : 10/888881
DATED : November 10, 2009
INVENTOR(S) : Power et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1523 days.

Signed and Sealed this

Nineteenth Day of October, 2010

David J. Kappos
*Director of the United States Patent and Trademark Office*